United States Patent Office 3,513,394
Patented May 19, 1970

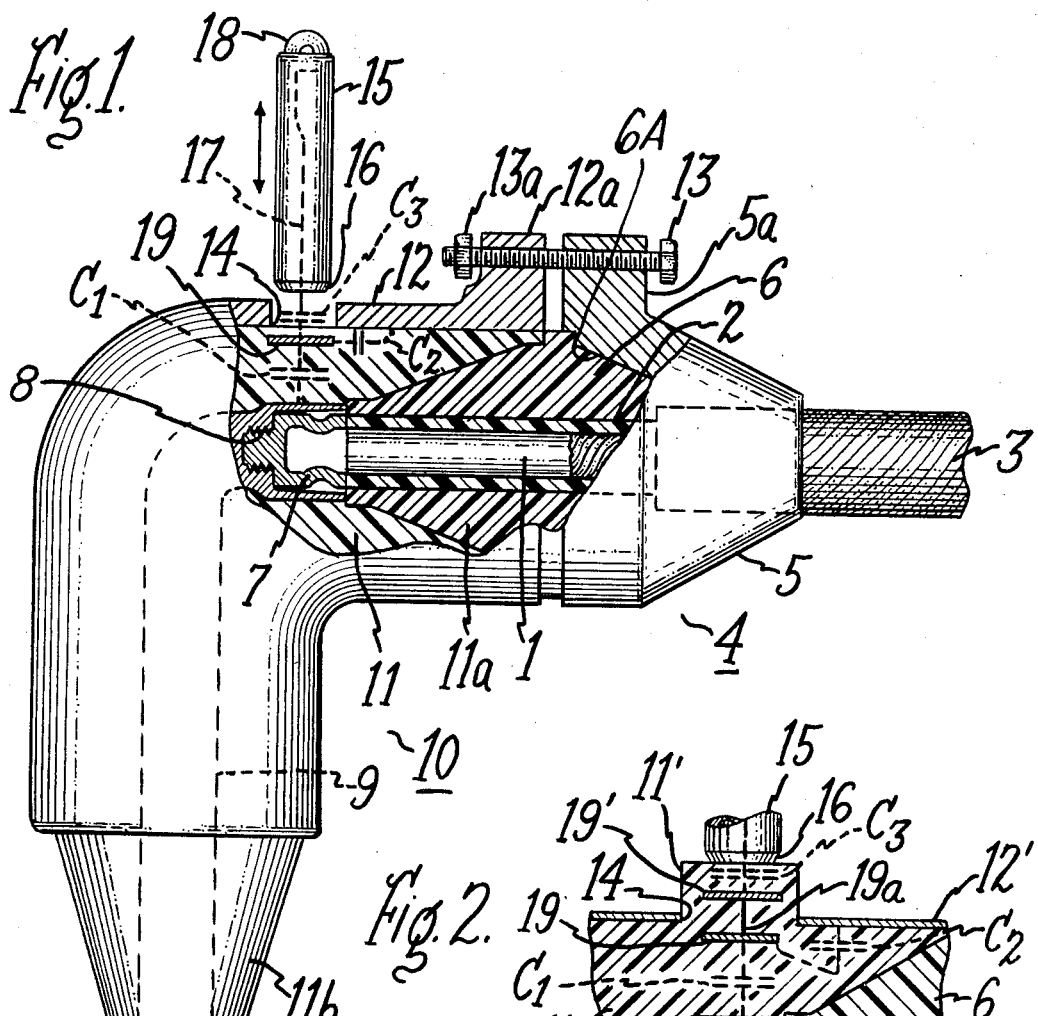
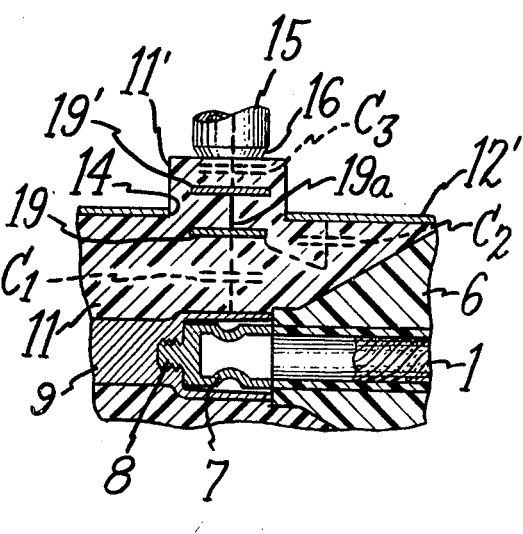
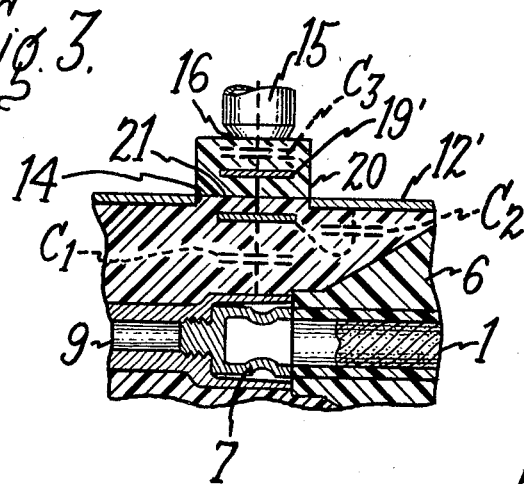

3,513,394
INSULATED VOLTAGE SOURCE FOR HIGH
VOLTAGE CONDUCTOR TERMINATIONS
Henry N. Tachick, Pittsfield, Mass., assignor to General
Electric Company, a corporation of New York
Filed June 21, 1968, Ser. No. 739,112
Int. Cl. G01r 19/16
U.S. Cl. 324—133                              2 Claims

ABSTRACT OF THE DISCLOSURE

An insulated high voltage conductor termination of the type provided with a ground sheath on its outer surface, characterized by having a capacitive voltage-dividing electrode embedded in its insulation and sealed from exposure to, or direct communication with, the surface of the termination. The capacitive voltage divider is adapted to be capacitance coupled to a voltage responsive indicating means thereby to energize the indicating means with a voltage that is directly proportional to any voltage impressed on the high voltage conductor of the termination, thus affording an indication of whether or not the conductor is energized.

---

In high voltage underground power distribution systems it is necessary to provide means for uncoupling the respective conductors and operating components of the system for maintainance or replacement purposes. Since the high voltages present on such systems can be particularly dangerous to operating personnel in the confined work areas usually available in the undeground vaults that house the equipment and afford access to it, it is very desirable to have some means for indicating when the system is properly de-energized before proceeding to disengage, or re-engage its conductor terminations. Recognizing this fact, many electric utility companies have established operating safety procedures that prohibit their personnel from directly contacting underground power cables until they have positive assurance that the cables are de-energized. Another known safety procedure in the underground power distribution field is to provide voltage indicating means that can be capacitively coupled to high voltage conductor terminations to indicate the presence of a voltage on the insulated conductors in the terminations. Heretofor, such indicating means have been adapted to directly contact an exposed electrode that is mounted on the surface of the termination and electrically connected to a capacitance plate member embedded beneath the outer surface of the insulation for the termination.

Although such exposed capacitance taps provide an adequate method for measuring the voltage present on the termination, they have several inherent drawbacks. For example, since underground terminations are frequently exposed to corrosive moisture conditions, it is usually necessary to provide some sort of water-tight cap or seal for covering the exposed surface electrode of the tap when it is not in use, to prevent the electrode and its associated capacitance plate from being damaged by corrosion. The use of such sealing caps introduces a wasteful, time consuming operation that a maintenance man or lineman must perform before he can bring an indicating instrument into contact with the tap electrode to determine whether or not the termination is energized. In addition to the inefficiency introduced by the use of protective caps, there is an inherent danger of the operator sustaining a high voltage shock in performing this seal removing operation. Moreover, there is always a problem in attaining an adequate seal to prevent corrosion of the exposed electrode; therefore, an additional expense of manufacture is imposed on the system by requiring a precision seal to assure proper protection of the capacitance tap electrode. Even when the electrode is protected from corrosion, the reliability and accuracy of the indicating instrument readings obtained with such an exposed electrode arrangement are always subject to distortion due to the presence of dirt or other contaminants trapped adjacent or over the exposed electrode by the sealing arrangement.

Accordingly, it is an object of my invention to provide a capacitive voltage divider for a high voltage electrical conductor termination having means for insulating the divider from exposure to the surface of the termination.

Another object of my invention is to provide a capacitive voltage divider for a high voltage conductor termination which is inexpensive to manufacture and always in operative position for use with an associated indicating means, without requiring an intermediate activating or positiong step to put it into use.

A further object of my invention is to provide a capacitive voltage divider for a high voltage conductor termination that is self-sealing and, thus, inherently protected from corrosion or contamination by materials that may reduce the reliability of the capacitance voltage divider when employed with associated indicating means.

Further objects and advantages of the invention will become more readily apparent from the following detailed description when considered in conjunction with the accompanying drawings in which:

FIG. 1 is a side elevation, partly in cross section and partly in phantom, showing a high voltage conductor termination embodying a preferred form of my invention.

FIG. 2 is a fragmentary cross sectional view of a second embodiment of my invention shown with respect to a portion of a high voltage conductor termination.

FIG. 3 is a framentary, cross sectional view of still another embodiment of my invention, also shown with respect to a high voltage conductor termination.

Referring now to FIG. 1 of the drawing, there is shown a high voltage conductor 1 having a coaxial layer of insulating material 2 and a metallic ground sheath 3 disposed around it. The cable 1 is suitably terminated in a voltage graded, insulated termination 4 comprising a metallic ferrule 5 slidably abutting an elastomeric sealing member 6, both ends of which are sloped to provide stress cone surfaces for smoothly grading the longitudinal electric field along the conductor 1 from the ground sheath 3 to the conductive surface of ferrule 5. The end of conductor 1 is capped with a threaded contact 7 which is crimped in position on conductor 1. In the coupled arrangement of terminations shown in FIG. 1, the threaded contact 7 is screwed into a threaded bore 8 in an elbow-shaped conductor 9, which provides a conductive path between opposite ends of a second termination 10. A tubular layer of a suitable insulating material 11 encases the conductor 9 and, in turn, is sheathed by an outer conductive surface member 12, which may be formed of a metal such as aluminum, or it may be a layer of semi-conductive material bonded to the outer surface of the termination 10 in any suitable manner.

The creepage distance between the exposed end of the embedded conductor 9 and the conductive outer member 12 along the end surfaces of insulating member 11 must be sufficient to prevent flashover, or arcing, between these two component parts. Accordingly, the frustoconical surfaces 11A and 11B are provided at opposite ends of the insulating member 11 to provide a creepage path of suitable length between conductor 9 and conductive sheath 12, as is well known in the high voltage cable termination art. A water-tight electrically sealed junction is formed between the relatively flexible elastomeric insulating material 6 of the termination 4 and the resilient insulating material 11, at surface 11A, of termination 10 by forcing the ferrule 5 into contact with the sloped surface 6A of the member 6. This forcing action is provided by a bolt 13 adapted to be rotatably threaded into a mating nut 13A. The bolt 13 is slidably positioned in suitable bores or channels in projecting shoulders 5A and 12A, respectively. integrally formed on ferrule 5 and sheath 12. Since the ends of ground shield cable 3 are also clasped firmly by the metallic frustoconical ferrule 5, a continuous stress relieving conductive cone is formed by ferrule 5 from the end of cable 3 to the conductive bolt 13. Accordingly, a continuous electrically conductive path is formed on the outer surface of the coupled terminations 4 and 10 by the cable 3, the ferrule 5, the bolt 13 and the conductive sheath 12 on termination 10. Thus, a smoothly graded longitudinal electric field between the embedded conductive members 1, 7 and 9 and the outer grounded conductive members 3, 5, 13 and 12, forms a uniformly stressed field across the insulating components 2, 6 and 11.

Pursuant to my invention, an opening 14 is formed in conductive sheath 12 at a suitable preselected point on the outer surface of termination 10. The opening 14 has an area of sufficient mean diameter to readily accommodate the probe end of a voltage indicating instrument, such as a statiscope 15 depicted in FIG. 1. It will be understood that any suitable indicating means that is adapted to be energized by capacitance coupling to its signal sensing probe may be used with my invention; however, to facilitate an understanding of how my invention functions to energize such an indicating means, the invention will be described herein with respect to the statiscope 15. For purposes of this description it is only necessary to understand that the statiscope 15 may be of any conventional form, such as the primary type of instrument shown in FIG. 1, which comprises an electrode 16 at its lower end electrically connected by a relatively low resistance conductive wire 17 to an indicating glow lamp 18 mounted at its upper end. These basic components are housed in, or mounted on, a suitable body of insulating material, such as epoxy which may be in the cylindrical form shown. When the electrode 16 of the statiscope 15 is capacitance coupled to an adequately high voltage, current is passed from the electrode 16 through the wire 17 to lamp 18 and then to ground through the capacitance coupling of the ambient atmosphere and any other associated capacitance such as that which may be afforded by an operator manually contacting the insulated housing of statiscope 15.

Centrally disposed with respect to the exposed area of the surface of termination 10 defined by the opening 14 in conductive sheath 12, is an electrode 19 embedded in the insulation 11. In this embodiment of my invention, the electrode 19 comprises a disc-shaped aluminum electrode approximately one inch in diameter that is molded into the layer of insulation 11 at a radially spaced point with respect to the outer conductive sheath 12 and the high voltage conductor 9, such that electrode 19 is substantially closer to the sheath 12 than to the conductor 9. In other embodiments of the invention, the electrode 19 may be embedded in the elastomeric insulation 11 by slitting the insulation and inserting the electrode into it, but it is important in such embodiments that the insulating material 11 always form a contiguous seal over the electrode 19 when the termination 10 is put into use, in order to prevent contaminating moisture or other deleterious materials from contacting the electrode 19. In such slitted arrangements, I have found it is desirable to heat seal the surface of the slitted area of insulation 11 above the electrode 19 so that a continuous hermetic seal is formed between the electrode 19 and the outer conductive sheath 12.

Since the electrode 19 is surrounded by the insulating material 11, it acts as a capacitive voltage divider in the uniformly stressed field existing between conductor 9 and sheath 12, when conductor 9 is energized. This voltage dividing effect is diagrammatically illustrated in FIG. 1 by the capacitances $C_1$ and $C_2$, respectively, shown connected between conductor 9 across dielectric 11 to electrode 19, and between sheath 12 across the dielectric insulation 11 to electrode 19. It will be understood that since electrode 19 is substantially closer to sheath 12 than to conductor 9, the major portion of the voltage drop in the stressed field will occur across capacitor $C_1$, with only a relatively small voltage drop occurring across capacitance $C_2$. The thickness of the dielectric layer between electrode 19 and sheath 12 will be determined in advance of the above-mentioned molding operation that embeds electrode 19 in insulation 11, based upon the design voltage range of the termination 10.

In operation, when the electrode 16 on statiscope 15 is placed on the surface of termination 10 in the area defined by the opening 14 therein, it essentially forms a third capacitance, shown diagrammatically as $C_3$, between electrodes 16 and 19 across the dielectric layer of insulation 11 therebetween. In this embodiment of the invention, the voltage drop across capacitance $C_3$ is approximately equal to the voltage drop across capacitance $C_2$ and, when the conductor 9 is energized, this voltage drop across capacitance $C_3$ is adequate to energize indicating lamp 18. Accordingly, a visual indication of the energized status of the termination 10, is afforded by simply placing the electrode 16 in the opening 14, without any intermediate operation being required, so that a lineman can readily check this voltage status and take appropriate safety measures before handling the termination 10, or otherwise working on the system.

Referring now to FIG. 2 of the drawing in which component parts similar to those in FIG. 1 are designated by like reference numerals, there is shown a fragmentary view of a high voltage conductor 1 having a contact 7 crimped on its end. The contact 7 is coupled to a second conductor 9 embedded in insulation 11, which may be epoxy or any other suitable insulating material. The outer surface of the insulating material 11 is coated with a sheath 12' of semi-conductive material which is bonded thereto by a suitable heat treating process. The semiconductive sheath 12 has an opening 14 formed therein which accommodates a projecting portion 11' of the insulating material 11 surrounding the conductor 9. Embedded in the insulating material 11 at a point spaced substantially closer to the sheath 12' than to the high voltage conductor 9 is a wafer-shaped electrode 19 formed integrally with a connecting link 19A to a second wafer-shaped electrode 19'. The second electrode 19' is disposed outwardly from the surface of semi-conductive sheath 12'. It will be understood that in forming this embodiment of my invention the insulating material 11 is molded around the combined electrode 19–19' so that the portion of the insulation 11' is homogenous with the remainder of the insulating body 11. This particular embodiment of my invention affords a capacitance voltage dividing means that may be advantageously employed on a high voltage termination of an underground power distribution system where it is necessary or desirable to frequently use an indicating instrument, such as the statiscope 15, to measure the presence of voltage on the conductor 9. It will be noted that the projecting portion $11_2$ protrudes a substantial distance above the surface of the semi-conductive sheath 12 and, thus, is readily visible to an operator so that it serves as a means to quickly locate the electrode $19_419'$ so that it can be rapidly put into use.

In operation, this second embodiment of the invention functions in much the same manner as the embodiment of the invention shown in FIG. 1. Specifically, the combined electrode 19–19' is capacitively coupled to both the conductor 9 and the semi-conductive sheath 12', so that is serves to divide the stressed electric field developed between these components. This capacitive division of voltage is shown schematically by the capacitances $C_1$ and $C_2$, illustrated in phantom in FIG. 2. When an indicating instrument, such as the statiscope 15, is brought into contact with the upper surface of the insulated projecting portion 11', as shown in FIG. 2, its electrode 16 is capacitively coupled by the schematically illustrated capacitance $C_3$ to the electrode 19'. This capacitance coupling is adequate to energize the indicating means (not shown in FIG. 2) on the statiscope 15 when the high voltage conductor 9 is energized. An advantage inherent in this form of my invention is that the strength of signal transmitted to the statiscope 15 can be readily increased by reducing the thickness of the layer of dielectric material on the upper surface of the projecting portion 11' of insulation 11 between electrode 19' and electrode 16 of the statiscope. Since the voltage indicating signal produced by a commercially available statiscope, such as statiscope 15, is a direct function of the voltage applied to its sensing electrode 16, it may be desirable to increase the strength of the input signal in this manner, i.e., by shaving some of the dielectric material from the top surface of the projecting portion 11' of insulation 11 to increase the capacitance coupling effect of capacitance $C_3$. When performing such an operation, care must be taken to leave a thick enough layer of insulation in the 11' above electrode 19' to completely protect the electrode from exposure to tthe atmosphere or to contaminating moisture.

A modified form of the embodiment of my invention depicted in FIG. 2, is shown in FIG. 3 of the drawing. Again, like reference numerals refer to similar component parts in FIG. 2 and 3. Thus, a high voltage conductor 1 is shown embedded in insulating material 6 and coupled by a contact 7 to a second conductor 9, which in turn in embedded in insulation 11 that is sheathed by an outer conductive material 12. In this embodiment of the invention, the outermost electrode 19' of a capacitive voltage dividing means constructed pursuant to my invention, is encased in a block of dielectric insulating material 20, which has different dielectric properties than those possessed by the insulating material 11. This block of dielectric material 20 is sealed at the junction 21 to the insulating material 11 exposed by an opening 14 in the conductive sheath 12. The sealing operation may be accomplished in any suitable manner, such as by heat treating the respective surfaces of insulation 11 and dielectric member 20 to form a hermetic seal therebetween. With this form of my invention, it is possible to readily produce a desired value of capacitance $C_3$ for the capacitance formed between electrode 19' and electrode 16 of an indicating statiscope 15, regardless of the nature of the insulating material 11 on the termination 10 with which the invention is practiced. Therefore, an advantage of this form of the invention is that the value of capacitance $C_3$ can be established without having to consider the dielectric properties of insulation 11. Moreover, since the dielectric member 20 projects outwardly from the sheath 12, it may be desirable to form the member 20 of mechanically tougher material than that used for the insulation 11, and this form of the invention affords such flexibility while providing the basic capacitive voltage dividing function necessary to energize a suitable indicating means, as described above.

What I claim as new and desire to secure by Letters Patent of the United States is:

1. In a voltage-grading electric cable termination comprising a high voltage conductor surrounded by a layer of insulating material having an electrically conductive sheath on its outer surface, the improvement comprising; means defining an opening in said sheath, an electrode embedded in said insulating material at a point adjacent the center of said opening and spaced radially from said conductor and said sheath respectively, said electrode being adapted to serve as a capacitive voltage divider between said conductor and said sheath, said electrode being spaced substantially closer to said sheath than to said conductor, dielectric sealing means providing a water-tight seal between said electrode and the outer surface of said termination in the area defined by the opening in said sheath, said sealing means comprising a layer of dielectric material sealed to said insulating material to form a continuous water-tight insulating layer over the electrode in the area defined by the opening in said sheath, the dielectric properties of said layer of dielectric material being different than the dielectric properties of said insulating material, wherein said electrode comprises a pair of wafer-shaped electrode portions disposed in substantially parallel planes and connected by an integral link portion, and wherein said layer of dielectric material forms an insulating means disposed in the opening of said sheath and extending outwardly from the surface of said termination, one of said wafer-shaped portions being embedded in said insulating means and disposed outwardly from the surface of said sheath, the other of said wafer-shaped portions being disposed inwardly from the surface of said sheath.

2. In a voltage-grading electric cable termination comprising a high voltage conductor surrounded by a layer of insulating material having an electrically conductive sheath on its outer surface, the improvement comprising; means defining an opening in said sheath, an electrode embedded in said insulating material at a point adjacent the center of said opening and spaced radially from said conductor and said sheath respectively, said electrode being adapted to serve as a capacitive voltage divider between said conductor and said sheath, said electrode being spaced substantially closed to said sheath than to said conductor, dielectric sealing means providing a water-tight seal between said electrode and the outer surface of said termination in the area defined by the opening in said sheath, said sealing means comprising a layer of dielectric material sealed to said insulating material to form a continuous water-tight insulating layer over the electrode in the area defined by the opening in said sheath, the dielectric properties of said layer of dielectric material being different than the dielectric properties of said insulating material, wherein said conductive sheath is formed of a semi-conductive material bonded on the outer surface of said termination, and including marking means for visually indicating the position of the opening in said sheath.

References Cited

UNITED STATES PATENTS

| | | | |
|---|---|---|---|
| 3,343,153 | 9/1967 | Waehner | 340—252 |
| 3,390,331 | 6/1968 | Brown et al. | 324—122 |
| 3,401,370 | 9/1968 | Weinfurt et al. | 339—91 |
| 3,412,353 | 11/1968 | Johnston | 174—18 X |
| 3,425,049 | 1/1969 | Robinson | 340—214 |
| 3,431,539 | 3/1969 | Majewski. | |

OTHER REFERENCES

German printed application, No. 1,132,653, July 5, 1962, Vick.

LARAMIE E. ASKIN, Primary Examiner

U.S. Cl. X.R.

339—113; 340—248